US008142555B2

United States Patent
Uji (10) Patent No.: US 8,142,555 B2
(45) Date of Patent: *Mar. 27, 2012

(54) METHOD OF TREATING VOLATILE ORGANIC COMPOUND AND SYSTEM FOR TREATING VOLATILE ORGANIC COMPOUND USING GAS TURBINE

(75) Inventor: Shigekazu Uji, Ichikawa (JP)

(73) Assignee: Ishikawajima-Harima Heavy Industries Co., Ltd. (JP)

( * ) Notice: Subject to any disclaimer, the term of this patent is extended or adjusted under 35 U.S.C. 154(b) by 1174 days.

This patent is subject to a terminal disclaimer.

(21) Appl. No.: 11/572,303

(22) PCT Filed: Aug. 18, 2005

(86) PCT No.: PCT/JP2005/015061
§ 371 (c)(1),
(2), (4) Date: Jan. 18, 2007

(87) PCT Pub. No.: WO2006/019131
PCT Pub. Date: Feb. 23, 2006

(65) Prior Publication Data
US 2008/0041032 A1    Feb. 21, 2008

(30) Foreign Application Priority Data
Aug. 19, 2004    (JP) .............................. P2004-239413

(51) Int. Cl.
*B01D 53/02* (2006.01)
(52) U.S. Cl. ................ 96/143; 95/113; 95/118; 95/141; 95/143; 95/148; 96/146; 96/125; 96/128; 96/130
(58) Field of Classification Search .................... 95/141, 95/121, 148, 118, 143, 139, 113; 96/143, 96/146, 125, 128, 130; 422/171, 177, 190; 423/247, 211, 245.1, 245.3
See application file for complete search history.

(56) References Cited

U.S. PATENT DOCUMENTS

| 4,919,692 A | 4/1990 | Vara et al. ........................ 55/59 |
| 5,137,547 A | 8/1992 | Chretien ............................ 55/16 |

(Continued)

FOREIGN PATENT DOCUMENTS

DE    2847714 A1    5/1980

(Continued)

OTHER PUBLICATIONS

International Search Report PCT/JP2005/015061 dated Nov. 7, 2005 (Japanese Patent Office).

(Continued)

*Primary Examiner* — Jason M Greene
*Assistant Examiner* — Karla Hawkins
(74) *Attorney, Agent, or Firm* — Ostrolenk Faber LLP (57) ABSTRACT

The invention aims at making a volatile organic compound harmless, and in addition comprehensively improving the energy efficiency within a facility where treatment of the volatile organic compound is necessary. In the invention, in order to achieve this aim, a solution means is adopted where, a discharge gas containing a volatile organic compound is supplied to an adsorption apparatus to adsorb the volatile organic compound in an adsorbent. The volatile organic compound is desorbed from the adsorbent with pressurized steam and mixed with the steam. The steam containing the volatile organic compound is supplied, in the pressurized state, to the combustion chamber of a gas turbine, and burned together with a fuel gas.

10 Claims, 8 Drawing Sheets

U.S. PATENT DOCUMENTS

| | | | | |
|---|---|---|---|---|
| 5,256,208 | A | 10/1993 | Rafson | 134/25.1 |
| 5,281,257 | A | 1/1994 | Harris | 95/115 |
| 6,051,199 | A * | 4/2000 | Teller | 423/245.1 |
| 6,139,604 | A | 10/2000 | Gottzmann et al. | 95/54 |
| 6,372,018 | B1 * | 4/2002 | Cowles | 95/18 |
| 2001/0037728 | A1 * | 11/2001 | Schimkat et al. | 95/113 |
| 2002/0110503 | A1 * | 8/2002 | Gittleman et al. | 422/190 |
| 2004/0147798 | A1 | 7/2004 | MacWhinnie et al. | 588/213 |
| 2005/0109207 | A1 | 5/2005 | Olander et al. | 95/141 |
| 2006/0124039 | A1 | 6/2006 | Kanai | 110/230 |

FOREIGN PATENT DOCUMENTS

| | | |
|---|---|---|
| DE | 34 23 169 | 1/1985 |
| DE | 40 03 668 | 8/1990 |
| EP | 1 788 222 | 5/2007 |
| JP | 54-61074 | 5/1979 |
| JP | 61-86927 | 5/1986 |
| JP | 61-086928 | 5/1986 |
| JP | 62-203929 | 9/1987 |
| JP | 63-20020 | 1/1988 |
| JP | 01-111117 | 4/1989 |
| JP | 1-231924 | 9/1989 |
| JP | 2000-000425 | 1/2000 |
| JP | 2000-425 | 1/2000 |
| JP | 2000-500837 | 1/2000 |
| JP | 2001-070750 | 3/2001 |
| JP | 2001-149742 | 6/2001 |
| JP | 2002-004890 | 1/2002 |
| JP | 2002-102645 | 4/2002 |
| JP | 2003-302030 | 10/2003 |
| JP | 2003-322324 | 11/2003 |
| JP | 2004-025135 | 1/2004 |
| JP | 2004-36492 | 2/2004 |
| JP | 2004-184003 | 7/2004 |
| JP | 2004-316476 | 11/2004 |
| KR | 2001-0099169 | 11/2001 |
| RU | 2 096 071 | 11/1997 |
| SU | 16638 | 10/1930 |
| SU | 454360 | 12/1974 |
| SU | 587961 | 1/1978 |
| SU | 931215 | 6/1982 |
| SU | 958665 | 9/1982 |
| SU | 1020688 | 5/1983 |
| SU | 1286252 | 1/1987 |
| SU | 1690826 | 11/1991 |
| SU | 1768249 | 10/1992 |
| WO | WO 97/13101 | 4/1997 |

OTHER PUBLICATIONS

Office Action issued on Apr. 11, 2008 in counterpart Chinese Patent Application No. 200580027699.X with English translation.

Japanese Notice of Reasons for Rejection mailed Apr. 6, 2010 in corresponding Japanese Patent Application No. 2006-531847 and English translation.

Decision to grant dated Aug. 3, 2009 issued in corresponding Russian Patent Application No. 2007106194 with English translation (12 pages).

Russian Office Action dated Apr. 8, 2009 issued in corresponding Russian Patent Application No. 2007106194 with Fnglish translation (9 pages).

Russian Office Action dated May 8, 2008 issued in corresponding Russian Patent Application No. 2007106194 with English translation (6 pages).

Korean Office Action dated Jan. 31, 2008 issued in corresponding Korean Patent Application No. 10-2007-0017171 with English translation (6 pages).

European Search Report dated Jun. 18, 2007 issued in corresponding European Application No. 07250706.4 (5 pages).

Russian Office Action dated Aug. 4, 2008 issued in corresponding Russian Patent Application No. 2007103078 with English translation (10 pages).

Russian Office Action dated Apr. 22, 2008 issued in corresponding Russian Patent Application No. 2007103078 with English translation (5 pages).

* cited by examiner

FIG. 3 a | A:ADSORPTION、B:COMPRESSION b | A:ADSORPTION、B:DESORPTION c | A:ADSORPTION、B:DECOMPRESSION d | A:ADSORPTION、B:COOLING

FIG. 4 e | A:COMPRESSION, B:ADSORPTION f | A:DESORPTION, B:ADSORPTION g | A:DECOMPRESSION, B:ADSORPTION h | A:COOLING, B:ADSORPTION

METHOD OF TREATING VOLATILE ORGANIC COMPOUND AND SYSTEM FOR TREATING VOLATILE ORGANIC COMPOUND USING GAS TURBINE

CROSS REFERENCE TO RELATED APPLICATION

The present application is a 35 U.S.C.§371 national phase conversion of PCT/JP2005/015061 filed Aug. 18, 2005, which claims priority of Japanese Application No. P2004-239413 filed Aug. 19, 2004, which are incorporated by reference. The PCT International Application was published in the Japanese language.

TECHNICAL FIELD

The present invention relates to a treatment method and a treatment system for treating a gaseous volatile organic compound using a gas turbine.

SUMMARY OF THE INVENTION

Background Art

In the case of using various types of volatile organic compounds such as toluene, xylene, or the like, there is much concern regarding disposal of the volatile organic compound after use. In the case where the release is small, the discharge gas containing the used volatile organic compounds may be discharged to the atmosphere within a range which falls below a reference value. However in the case where the discharge amount is large (that is in most cases), this is treated by providing a separate treatment facility.

As a conventional general treatment method, at first the discharge gas containing the volatile organic compound is supplied to an adsorption apparatus, and the volatile organic compound is adsorbed in an adsorbent, and the adsorbent which has adsorbed the volatile organic compound is then desorbed in steam, so that the volatile organic compound is mixed with the steam. Next, the steam which has adsorbed the volatile organic compound is condensed, and the condensed water is distilled, so that the volatile organic compound and the water are separated. Finally, the volatile organic compound which has been separated from the water is burnt, and thus decomposed.

In the conventional treatment method, in addition to the cost required for the set up of the treatment facility, there is also an increase in cost necessary for operating the facility. Therefore, a technique has been proposed for treating the volatile organic compound without extra cost, by using a gas turbine for example existing within a plant (for example Patent Documents 1, 2 and 3 described hereunder).

In the invention of Patent Document 1, an organic compound generated from a volatile organic compound is scavenged, and supplied to the inlet port of the air intake of the gas turbine, and compressed together with air in the compressor. Then the compressed air containing the toxic substance is supplied to the combustor, and together with this, fuel gas is supplied and burnt to thereby drive the turbine. The toxic substance is burnt in the combustion chamber and thus made harmless, and discharged to the atmosphere together with the exhaust of the gas turbine.

In the inventions of Patent Documents 2 and 3, waste fluid of a volatile organic compound is supplied directly to the combustion chamber, and together with this, fuel gas is supplied and burnt to thereby drive the turbine. The waste fluid of the toxic substance is burnt in the combustion chamber and made harmless, and discharged to the atmosphere together with the exhaust of the gas turbine.

Patent Document 1: Japanese Unexamined Patent Application, First Publication No. 2003-322324
Patent Document 2: Japanese Unexamined Patent Application, First Publication No. 2004-036492
Patent Document 3: Japanese Unexamined Patent Application, First Publication No. 2004-184003

DISCLOSURE OF INVENTION

Problems to be Solved by the Invention

Incidentally, in the above described treatment method, the following problems are indicated. In the invention of Patent Document 1, the construction is such that the toxic substance generated from the volatile organic compound is supplied to the air intake of the gas turbine, however a part of the intake air is not introduced to the combustion chamber, but is used in cooling the final stage turbine. Therefore, a part of the toxic substance does not pass through the combustion chamber, that is, is discharged from the gas turbine without being combusted, and hence is not sufficiently treated. In the invention of Patent Documents 2 and 3, waste fluid with a high concentration of toxic substance is supplied directly to the combustion chamber. Therefore, there is concern that the flame temperature may become too high.

The present invention takes into consideration the above circumstances with an object of making the volatile organic compound harmless, and in addition comprehensively improving the energy efficiency within a facility where treatment of the volatile organic compound is necessary.

Means for Solving the Problems

As a means for solving the above problems, a treatment method for a volatile organic compound which uses a gas turbine, of the following construction, and a treatment system for a volatile organic compound is adopted.

That is to say, in the present invention, as a first solution means according to a method of treating a volatile organic compound using a gas turbine, a means is adopted which has: adsorbing a volatile organic compound contained in a gas to be treated in an adsorbent; desorbing the volatile organic compound adsorbed in the adsorbent from the adsorbent using steam under a pressurized environment, and mixing with the steam; and burning the steam mixed with the volatile organic compound in a combustion chamber of a gas turbine.

Furthermore, as a second solution means according to a method of treating a volatile organic compound using a gas turbine, a means is adopted which in the first solution means, generates steam by using heat of combustion gas discharged from the gas turbine.

As a third solution means according to a method of treating a volatile organic compound using a gas turbine, a means is adopted which in the first or second solution means, alternately performs in parallel, adsorption of the volatile organic compound in the adsorbent, and desorption of the volatile organic compound from the adsorbent.

As a fourth solution means according to a method of treating a volatile organic compound using a gas turbine, a means is adopted which in any of the first through third solution means, supplies a part of the steam for desorption of the volatile organic compound from the adsorbent, to the combustion chamber of the gas turbine, without being supplied for desorption of the volatile organic compound.

As a fifth solution means according to a method of treating a volatile organic compound using a gas turbine, a means is adopted which in any one of the first through fourth solution means, applies pretreatment for concentrating the volatile organic compound, to the gas to be treated, and then adsorbs the volatile organic compound in the adsorbent.

As a sixth solution means according to a method of treating a volatile organic compound using a gas turbine, a means is adopted where in the fifth solution means, the pretreatment is either one or both of; a concentration treatment for concentrating the volatile organic compound by desorbing the volatile organic compound from the adsorbent using a hot gas, or a dehumidifying treatment for removing the water content from the gas to be treated, which are executed after adsorbing the volatile organic compound being a treatment object, in a predetermined adsorbent.

As a seventh solution means according to a method of treating a volatile organic compound using a gas turbine, a means is adopted which in two solution means of any one of the first through sixth solution means, after the volatile organic compound has been adsorbed in the adsorbent, performs heating using a hot gas, before desorbing the volatile organic compound of the adsorbent with steam.

As an eight solution means according to a method of treating a volatile organic compound using a gas turbine, a means is adopted where in the sixth or seventh solution means, the heated gas is discharge gas of combustion gas which has been supplied for generation of steam.

As a ninth solution means according to a method of treating a volatile organic compound using a gas turbine, a means is adopted where in the sixth or seventh solution means, the hot gas is air which has been heated by heat transfer with discharge gas of combustion gas which has been supplied for generating steam.

On the other hand, in the present invention, as a first solution means according to a system for treating a volatile organic compound, a means is adopted having: an adsorption apparatus which adsorbs a volatile organic compound contained in a gas to be treated in an adsorbent, and desorbs the volatile organic compound which is adsorbed in the adsorbent using steam under a pressurized environment, and mixes this with steam; and a gas turbine which burns the steam mixed with the volatile organic compound in a combustion chamber.

As a second solution means according to a system for treating a volatile organic compound, a means is adopted where, in the first solution means, there is provided a steam generation apparatus which generates steam using heat of combustion gas discharged from the gas turbine.

As a third solution means according to a system for treating a volatile organic compound, a means is adopted where, in the first or second solution means, there is further provided a plurality of adsorption apparatuses, and a switching apparatus which switches the plurality of adsorption apparatuses so that adsorption of the volatile organic compound in the adsorbent, and desorption of the volatile organic compound from the adsorbent are alternately performed in parallel.

As a fourth solution means according to a system for treating a volatile organic compound, a means is adopted where, in any one of the first through third solution means, there is further provided a steam bypass control valve which adjusts a flow of steam supplied directly to a combustion chamber without passing through the adsorption apparatus.

As a fifth solution means according to a system for treating a volatile organic compound, a means is adopted where, in any one of the first through fourth solution means, there is further provided a pretreatment apparatus for concentrating a volatile organic compound contained in a gas to be treated, before adsorbing the volatile organic compound in the adsorbent.

As a sixth solution means according to a system for treating a volatile organic compound, a means is adopted where, in the fifth solution means, the pretreatment apparatus is either one or both of; a concentrator which concentrates the volatile organic compound by desorbing the volatile organic compound from the adsorbent using a hot gas, and a dehumidifier which removes the water content from the gas to be treated, after adsorbing the volatile organic compound being a treatment object, in a predetermined adsorbent.

As a seventh solution means according to a system for treating a volatile organic compound, a means is adopted where in any one of the first through sixth solution means, heating is performed using a hot gas, before desorbing the volatile organic compound in the adsorbent with steam, in the adsorption apparatus.

As an eight solution means according to a system for treating a volatile organic compound, a means is adopted where in the sixth or seventh solution means, the hot gas is discharge gas of combustion gas which has been supplied for generating steam in the steam generator.

As a ninth solution means according to a system for treating a volatile organic compound, a means is adopted where in the seventh solution means, there is further provided a heating apparatus which heats air by heat exchange with discharge gas of combustion gas which has been supplied for generating steam, and the hot gas is hot air discharged from the heating apparatus.

Effects of the Invention

In the present invention, since the steam mixed with the volatile organic compound is supplied to the combustion chamber of the gas turbine and combusted, the volatile organic compound can be made harmless. Moreover, the situation where highly concentrated volatile organic compound is supplied to the combustion chamber so that the flame temperature becomes too high can be prevented, and the overall energy efficiency can be improved. Furthermore, by supplying the steam to the combustion chamber, the amount of NOx in the combustion gas discharged from the gas turbine can be reduced, and hence deterioration in the surroundings due to the NOx can be suppressed.

Moreover, by producing steam using heat retained in the combustion gas discharged from the gas turbine, and supplying this to the adsorption apparatus, then compared to the case where the steam is provided from another system, the energy necessary for producing the steam can be reduced.

DESCRIPTION OF THE REFERENCE SYMBOLS

1 Adsorption apparatus
2 Gas turbine
3 Steam generator
4 Compressor
5 Combustion chamber
6 Turbine
7 Load Description of a Preferred Embodiment Hereunder is a description of embodiments of the present invention, with reference to the drawings.

First Embodiment

Figure 1:
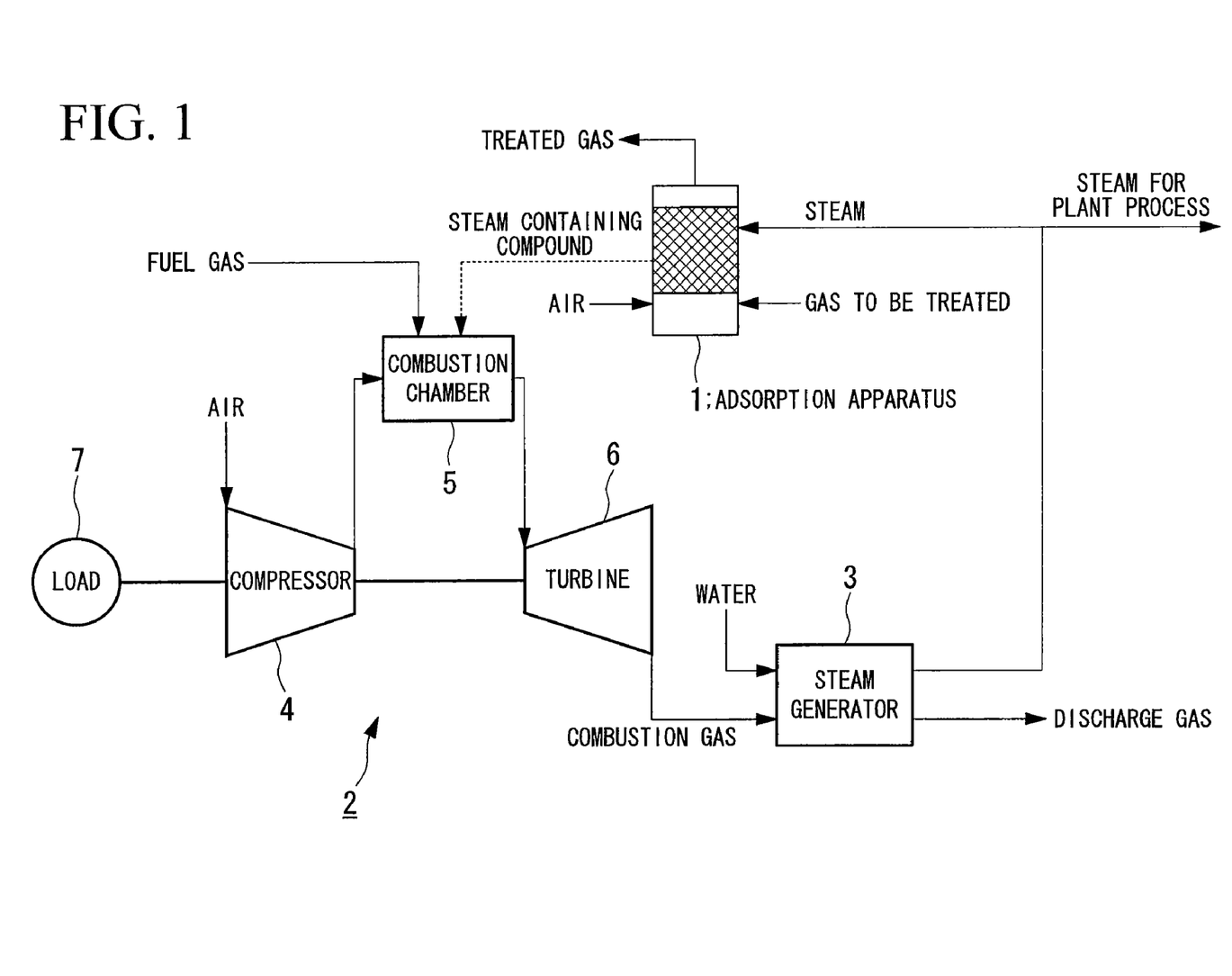
FIG. 1 is a system block diagram showing a characteristic configuration of a volatile organic compound treatment system according to a first embodiment of the present invention.

FIG. 1 is a system block diagram showing a characteristic configuration of a volatile organic compound treatment system according to a first embodiment of the present invention. In FIG. 1, reference symbol 1 denotes an adsorption apparatus, 2 denotes a gas turbine, and 3 denotes a steam generator.

The adsorption apparatus 1 adsorbs a volatile organic compound contained in a gas to be treated, in an adsorbent thereinside, to thereby remove the volatile organic compound from the gas to be treated, and desorbs the volatile organic compound adsorbed in the adsorbent, using steam under a pressurized environment, and mixes this with steam. For the adsorbent, for example activated carbon is used. Furthermore, the pressurized environment is realized by supplying steam to the adsorption apparatus 1.

In such an adsorption apparatus 1, the gas to be treated is input from the outside, and together with this, steam is input from the steam generator 3. On the other hand, the treated gas from which the volatile organic compound removed is discharged to the outside, and together with this, a steam containing compound in which the volatile organic compound is mixed, is output to a combustion chamber 5 of a gas turbine 2. In the adsorption apparatus 1, as shown in the figure, since it is necessary to cool the adsorbent, air (cooling air) is introduced.

The gas turbine 2 has; a compressor 4 for compressing air, a combustion chamber 5 for supplying fuel gas to the compressed air and combusting, and generating combustion gas, and a turbine 6 which is rotated by the kinetic energy and pressure energy of the combustion gas, and generates a drive force for the compressor 4 and an external load 7. In the gas turbine 2 steam mixed with the volatile organic compound in the adsorption apparatus 1 is supplied in a pressurized state to the combustion region of the combustion chamber 5, and burnt together with the fuel gas. The load 7 is for example a generator.

The steam generator 3 is a type of heat exchanger which uses heat retained in the combustion gas discharged from the gas turbine 2 to generate steam. This steam generator 3 is an exhaust heat recovery boiler. The steam in a pressurized state generated in the steam generator 3 is supplied to the outside as plant process steam, and is also supplied to the adsorption apparatus 1.

The method of treating the volatile organic compound by means of the treatment system of the above described construction will be described.

When the gas to be treated containing the volatile organic compound is supplied to the adsorption apparatus 1, the volatile organic compound is adsorbed in the adsorbent. Then, the volatile organic compound adsorbed in the adsorbent is desorbed from the adsorbent by the operation of the steam under a pressurized atmosphere, and is mixed with the steam. Here the pressurized environment is realized by supplying steam to the adsorption apparatus 1. However the method of realizing the pressurized environment is not limited to this. For example, the pressurized environment inside the adsorption apparatus 1 can also be realized by supplying a part of the compressed air discharged from the compressor 4 to the adsorption apparatus 1.

In this manner, the steam mixed with the volatile organic compound (steam containing compound) is supplied to the combustion region of the combustion chamber 5 of the gas turbine 2 in the pressurized state. Then, the volatile organic compound in the steam containing compound is burnt together with the fuel gas in the combustion chamber to thereby be made harmless. All or a part of the combustion gas of the combustion chamber 5 rotates the turbine 6, after which this is introduced to the steam generator 3, and steam is produced by heat exchange with water. That is to say, in the steam generator 3 the water is evaporated by the heat in the fuel gas to generate steam. A part or all of the steam generated in this manner is supplied in a pressurized state to the adsorption apparatus 1, and used for desorbing the volatile organic compound from the adsorbent.

According to this present embodiment, since the steam mixed with the volatile organic compound is supplied to the combustion chamber 5 of the gas turbine 2 and burnt, the volatile organic compound can be made completely harmless compared to heretofore. Furthermore, since the steam mixed with the volatile organic compound is supplied to the combustion chamber 5 of the gas turbine 2 and burnt, the heat of combustion portion of the volatile organic compound can reduce part of the fuel used in the gas turbine. Therefore, the overall energy efficiency can be improved. Moreover, since steam is supplied to the combustion chamber 5, the amount of NOx in the fuel gas discharged from the gas turbine 2 can be reduced, and hence deterioration of the surrounding environment due to NOx can be suppressed.

Furthermore, since the heat retained by the combustion gas discharged from the gas turbine is used to generate steam, then compared to the case where the steam is provided from another system, the energy required for generating steam can be reduced. Consequently, the energy efficiency of the plant can be improved overall.

Incidentally, in the present embodiment, the heat of the combustion gas discharged from the gas turbine 2 is used to generate steam, however a facility for generating steam may be provided separately, and steam from this facility may be supplied.

Second Embodiment

Figure 2:
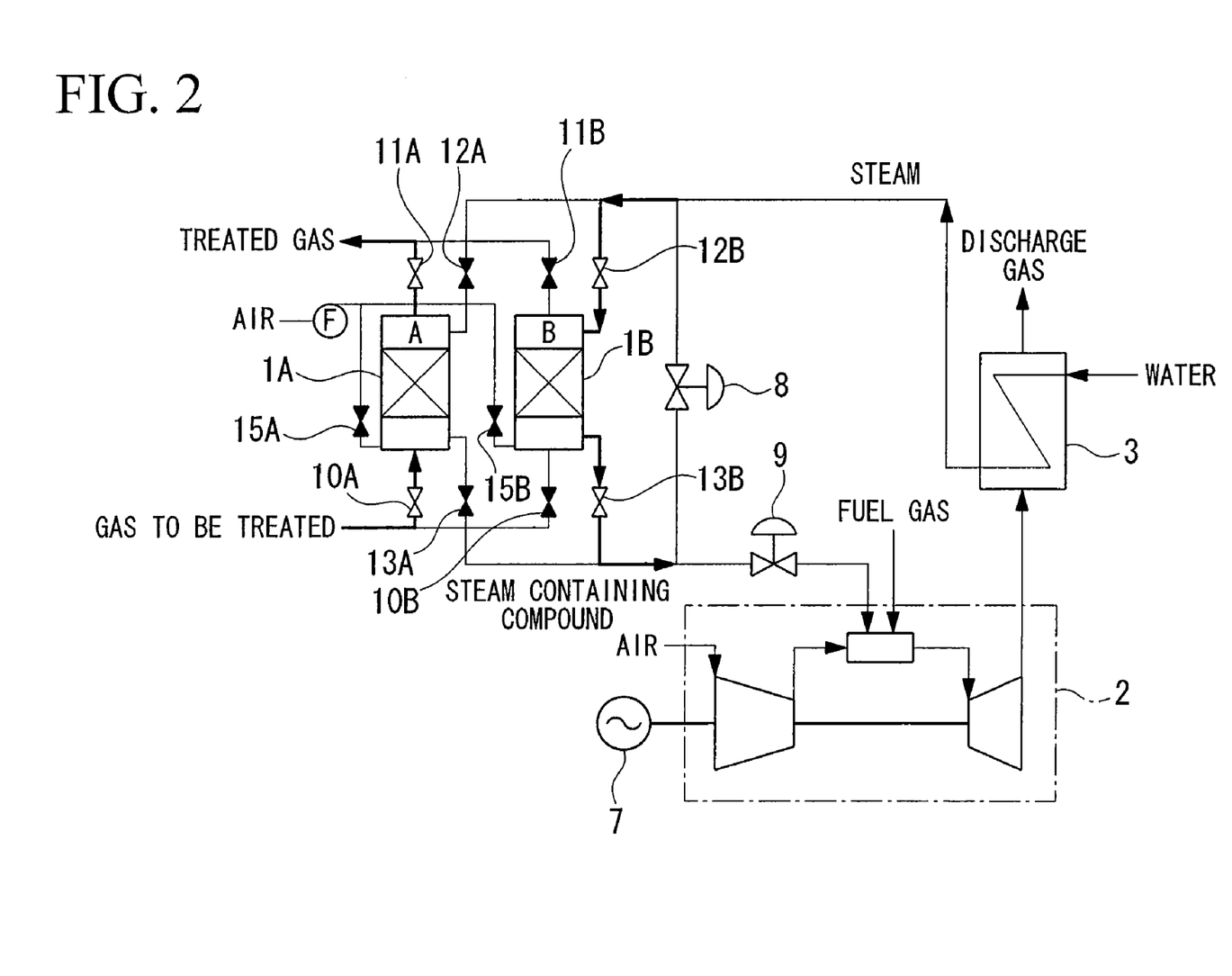
FIG. 2 is a system block diagram showing a characteristic configuration of a volatile organic compound treatment system according to a second embodiment of the present invention.

Next is a description of a second embodiment of the present invention, with reference to the system block diagram shown in FIG. 2.

At first, the quantity of steam that the gas turbine (i.e. the combustion chamber 5) requires for its own drive (the combustion steam quantity), and the quantity of steam that the adsorption apparatus 1 requires for adsorbing the volatile organic compound (the compound adsorption steam quantity), are not necessarily the same. That is, the combustion steam quantity needs to be determined from the requirements for safe and efficient operation of the gas turbine, while the compound adsorption steam quantity needs to be determined from the requirement for effective adsorption of the volatile organic compound.

In the volatile organic compound treatment system according to the first embodiment, the configuration was such that the steam containing compound discharged from the adsorption apparatus 1 was supplied as is, to the combustion chamber 5. Therefore the steam quantity supplied to the adsorption apparatus 1 and the steam quantity supplied to the combustion chamber 5 were the same. Consequently, there is the problem that the abovementioned combustion steam quantity and the compound adsorption steam quantity cannot both be satisfied.

Moreover, the adsorption apparatus 1 is one which switches between adsorbing the volatile organic compound in the adsorbent, and desorbing the volatile organic compound from the adsorbent under a pressurized environment. Hence there is a problem in that the discharge gas containing the volatile organic compound cannot be continuously treated The second embodiment is one for solving such problems of the first embodiment, being related to a system which is more realistically close to a volatile organic compound treatment system. In FIG. 2, components the same as in the first embodiment are denoted by the same reference symbols. In the following description, description related to components the same as in the first embodiments is omitted to avoid duplication.

In the system block diagram of FIG. 2, reference symbols 1A and 1B denote adsorption apparatuses, 8 denotes a steam bypass control valve, 9 denotes a steam injection control valve, 10A and 10B denote gas to be treated supply valves, 11A and 11B denote treated gas discharge valves, 12A and 12B denote steam supply valves, 13A and 13B denote steam discharge valves, 14 denotes a cooling air fan, and 15A and 15B denote cooling air supply valves.

The adsorption apparatus 1A (tower A) and the adsorption apparatus 1B (tower B) are similar to the adsorption apparatus 1 of the first embodiment. These adsorption apparatuses 1A and 1B, as shown in the figure, are provided in parallel with respect to the supply path for the gas to be treated and the steam, and as described later alternately perform volatile organic compound removal treatment with respect to the gas to be treated.

The steam bypass control valve 8 is an open/close valve provided between the inlet side of the steam supply valves 12A and 12B, and the outlet side of the steam discharge valves 13A and 13B, and directly supplies a part of the steam supplied to the adsorption apparatuses 1A and 1B to the steam injection control valve 9 without passing through the adsorption apparatuses 1A and 1B. That is, this is for supplying a part of the steam to the steam injection control valve 9, bypassing the adsorption apparatuses 1A and 1B.

The steam injection control valve 9 is provided between the steam bypass control valve 8 and the gas turbine 2 (actually the combustion chamber 5), and regulates the injection quantity of steam to the gas turbine 2. The gas to be treated supply valve 10A is an open/close valve provided in the gas to be treated supply port in the adsorption apparatus 1A (tower A), and performs supply/shutoff of the gas to be treated to the adsorption apparatus 1A. On the other hand, the gas to be treated supply valve 10B is an open/close valve provided in the gas to be treated supply port in the adsorption apparatus 1B (tower B), and performs supply/shutoff of the gas to be treated to the adsorption apparatus 1B.

The treated gas discharge valve 11A is an open/close valve provided in the treated gas discharge port in the adsorption apparatus 1A, and performs discharge/shutoff of the treated gas from the adsorption apparatus 1A. The treated gas discharge valve 11B is an open/close valve provided in the treated gas discharge port in the adsorption apparatus 1B, and performs discharge/shutoff of the treated gas from the adsorption apparatus 1B. The steam supply valve 12A is an open/close valve provided in the steam supply port in the adsorption apparatus 1A, and performs supply/shutoff of the steam to the adsorption apparatus 1A. The steam supply valve 12B is an open/close valve provided in the steam supply port in the adsorption apparatus 1B, and performs supply/shutoff of the steam to the adsorption apparatus 1B.

The steam discharge valve 13A is an open/close valve provided in the steam containing compound discharge port in the adsorption apparatus 1A, and performs discharge/shutoff of the steam containing compound from the adsorption apparatus 1A. The steam discharge valve 11B is an open/close valve provided in the steam containing compound discharge port in the adsorption apparatus 1B, and performs discharge/shutoff of the steam containing compound from the adsorption apparatus 1B.

The cooling air fan 14 is a power source for supplying cooling air to the adsorption apparatuses 1A and 1B. The cooling air supply valve 15A is an open/close valve provided between the cooling air fan 14 and the adsorption apparatus 1A, and performs supply/shutoff of cooling air to the adsorption apparatus 1A. The cooling air supply valve 15B is an open/close valve provided between the cooling air fan 14 and the adsorption apparatus 1B, and performs supply/shutoff of cooling air to the adsorption apparatus 1B.

In the volatile organic compound treatment system of the above configuration, in addition to the steam containing compound discharged from the adsorption apparatus 1A or the adsorption apparatus 1B, the steam which has passed through the steam bypass control valve 8 is supplied to the steam injection control valve 9. Consequently, the combustion steam quantity, and the compound adsorption steam quantity mentioned above, can be set separately.

For example, in the case where the combustion steam quantity is a flow rate R1, and the compound adsorption steam quantity is a flow rate R2 (where R1>R2), the difference in flow rate between R1 and R2 is supplied to the steam injection control valve 9 via the steam bypass control valve 8 so that the requirement for either one of the combustion steam quantity and the compound adsorption steam quantity can be satisfied. The case where R1<R2 is also considered, however in this case, this gives a condition where the compound adsorption steam quantity is not completely treated in the gas turbine 2, and hence this is not practical.

In this volatile organic compound treatment system, the steam injection control valve 9 is provided on the downstream side of the steam bypass control valve 8 in the flow direction of the steam (that is, between the steam bypass control valve 8 and the gas turbine 2). However the steam injection control valve 9 may be provided on the upstream side of the steam bypass control valve 8 (that is between the steam generator 3 and the steam bypass control valve 8). Also in this configuration, a similar operational effect to that mentioned above is obtained.

Figure 3:
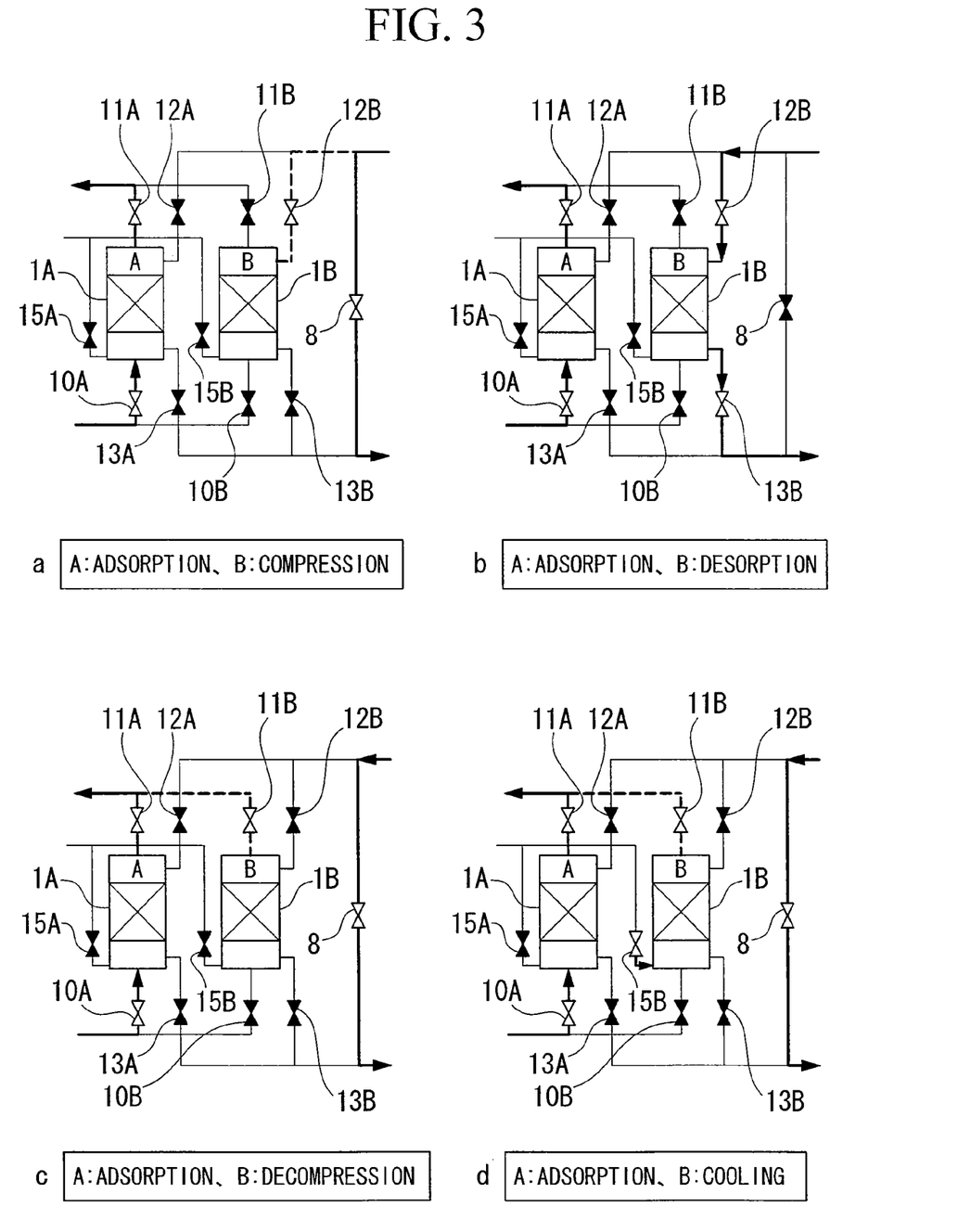
FIG. 3 is a schematic diagram showing operating states "a" to "d" of an adsorption apparatus in the second embodiment of the present invention.
Figure 4:
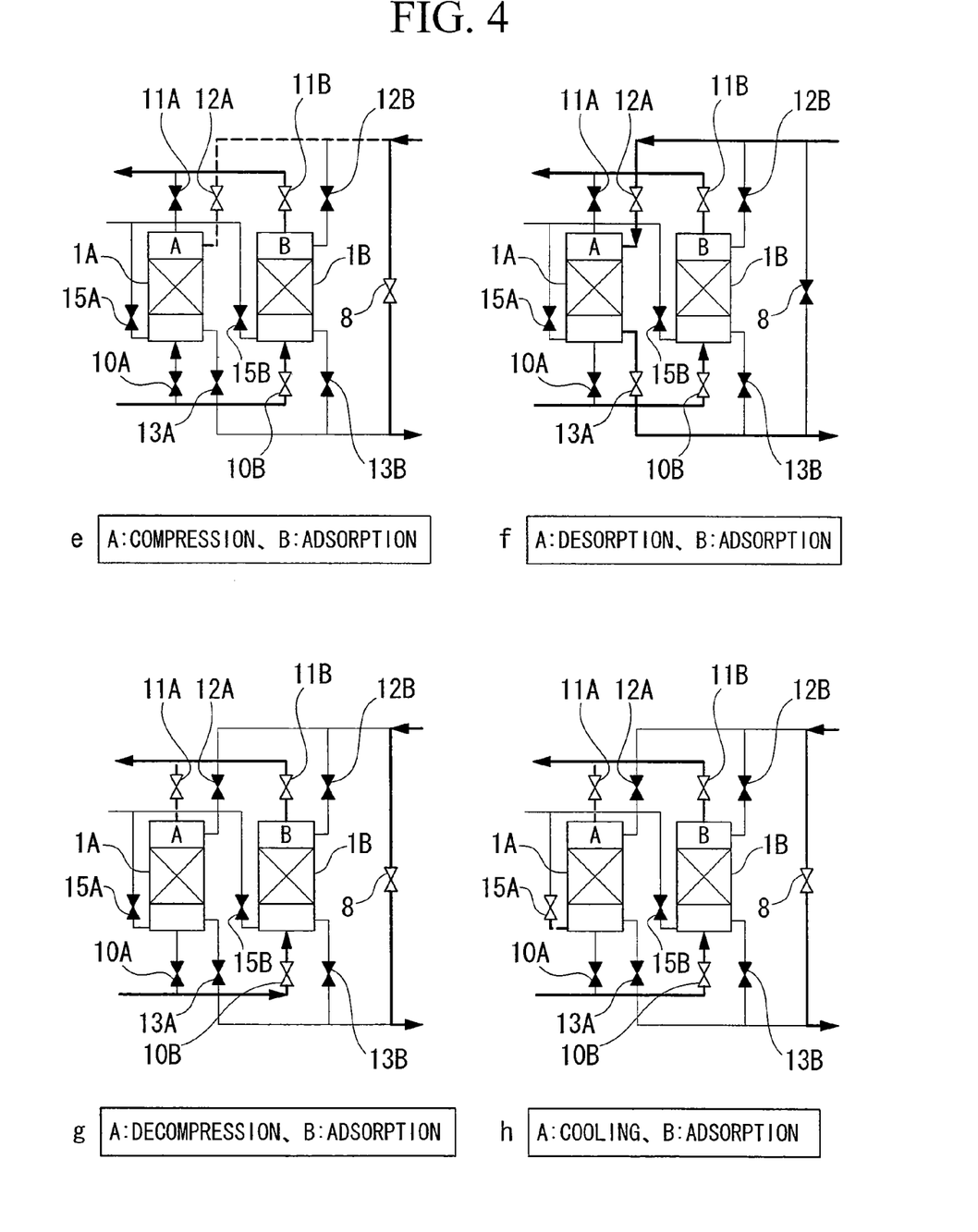
FIG. 4 is a schematic diagram showing operating states "e" to "h" of an adsorption apparatus in the second embodiment of the present invention.
Figure 5:
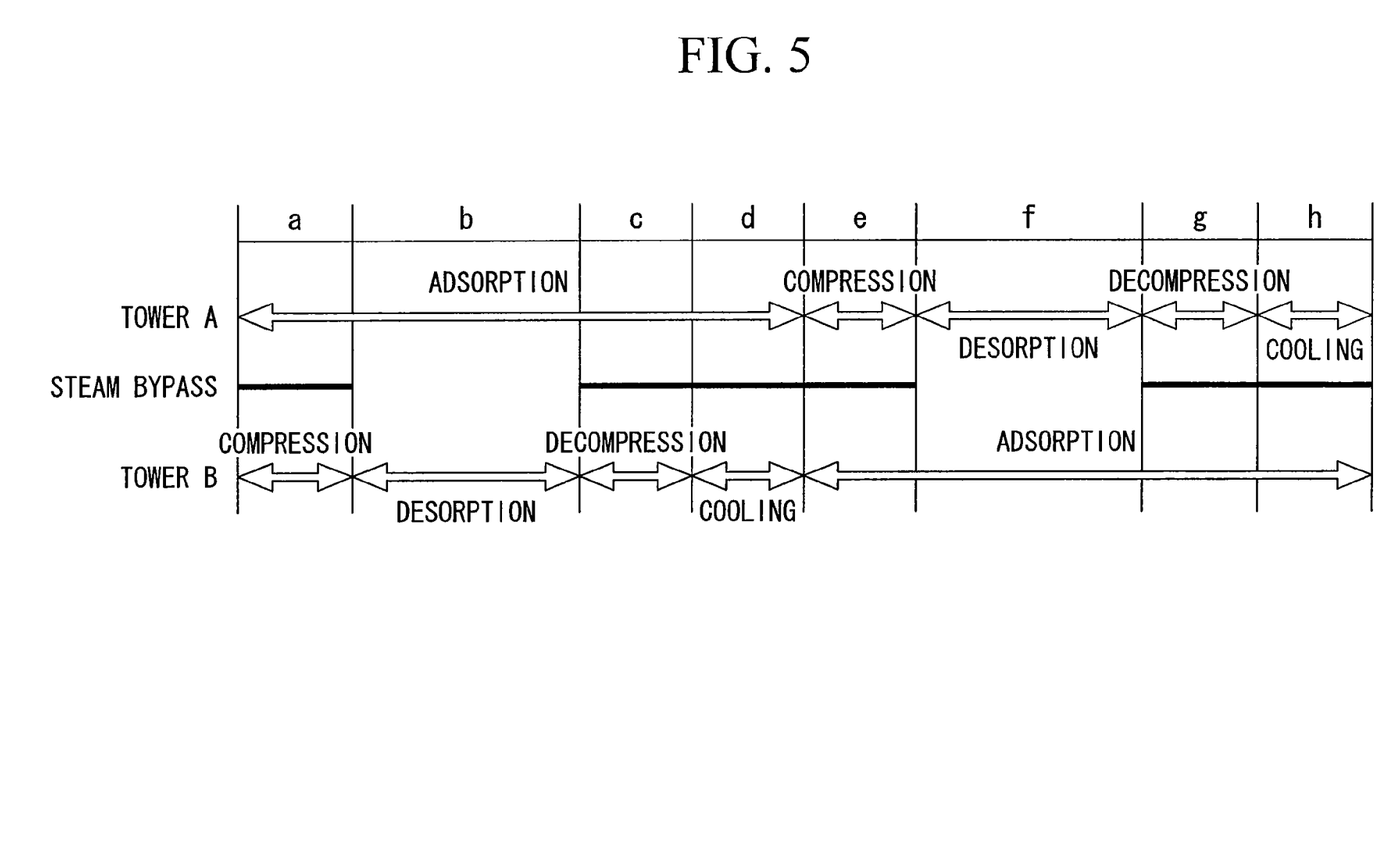
FIG. 5 is a timing chart showing change in operating conditions of an adsorption apparatus in the second embodiment of the present invention.

Next is a detailed description of the operation of the adsorption apparatus 1A and the adsorption apparatus 1B provided as a pair in parallel, with reference to FIG. 3 to FIG. 5. FIG. 3 and FIG. 4 show the change in the operating conditions "a" through "h" of the adsorption apparatus 1A and the adsorption apparatus 1B corresponding to the open/close conditions of the steam bypass control valve 8, the gas to be treated supply valves 10A and 10B, the treated gas discharge valves 11A and 11B, the steam supply valves 12A and 12B, the steam discharge valves 13A and 13B, and the cooling air supply valves 15A and 15B. Furthermore, FIG. 5 is a timing chart with the changes in the operating conditions "a" through "h" in FIG. 3 and FIG. 4, shown chronologically. The adsorption apparatus 1A and the adsorption apparatus 1B repeat these changes in the operating conditions "a" through "h" to thereby change the state in sequence from the adsorption state, to the compression state, the desorption state, the decompression state, the cooling state, and the adsorption state.

Regarding the steam bypass control valve 8, the gas to be treated supply valves 10A and 10B, the treated gas discharge valves 11A and 11B, the steam supply valves 12A and 12B, the steam discharge valves 13A and 13B, and the cooling air supply valves 15A and 15B in FIG. 3 and FIG. 4, the white space representation shows that the valves are in the open condition, and the black space representation shows that the valves are in the closed condition. In FIG. 3 and FIG. 4, the open/close condition of the steam bypass control valve 8 is also shown. However, the steam bypass control valve 8 is a valve for supplementing the difference in flow rate between the combustion steam quantity and the compound adsorption steam quantity as described above, and does not directly regulate the condition of the adsorption apparatus 1A and the adsorption apparatus 1B.

In the operating condition "a", the adsorption apparatus 1A is shown in the adsorption state, and the adsorption apparatus 1B is shown in the compression state. That is to say, the adsorption apparatus 1A sets the gas to be treated supply valve 10A and the treated gas discharge valve 11A to the open condition, and sets the steam supply valve 12A, the steam discharge valve 13A, and the cooling air supply valve 15A to the closed condition, to thereby give the adsorption state where the gas to be treated is sequentially supplied, and the treated gas is sequentially discharged. On the other hand, the adsorption apparatus 1B sets the steam supply valve 12B to the open condition, and sets the gas to be treated supply valve 10B, the treated gas discharge valve 11B, the steam discharge valve 13B, and the cooling air supply valve 15B to the closed condition, to thereby give the compression state where only the steam is sequentially supplied.

As shown in FIG. 5, the adsorption apparatus 1A continues the adsorption state over a comparatively long time of the operating conditions "a" through "d". On the other hand, the adsorption apparatus 1B shifts from the previous adsorption state to the compression state shown in the operating condition "a", and compresses to a sufficient pressure, and then changes to the desorption state shown in the operating condition "b". That is to say, the adsorption apparatus 1B, in addition to the steam supply valve 12B, sets the steam discharge valve 13B to the open condition, to thereby give the desorption state where the steam is sequentially supplied, and the steam containing compound is sequentially discharged.

In this operating condition "b", when the organic solvent adsorbed in the adsorbent inside the adsorption apparatus 1B is sufficiently desorbed under pressure, the adsorption apparatus 1B shifts to the decompression state as shown in the operating condition "c". That is to say, the adsorption apparatus 1B gives the decompression state by setting the treated gas discharge valve 11B to the open condition, and setting the gas to be treated supply valve 10B, the steam supply valve 12B, the steam discharge valve 13B, and the cooling air supply valve 15B to the closed condition.

Then, when the pressure inside the adsorption apparatus 1B drops to normal pressure the adsorption apparatus 1B shifts to the cooling state shown by the operating condition "d". That is to say, the adsorption apparatus 1B, in addition to the treated gas discharge valve 11B, sets the cooling air supply valve 15B to the open condition to thereby supply the cooling air to the inside to cool to normal temperature. Furthermore, the adsorption apparatus 1B, as shown by the operating condition "e" sets the gas to be treated supply valve 10B and the treated gas discharge valve 11B to the open condition and sets the steam supply valve 12B, the steam discharge valve 13B, and the cooling air supply valve 15B to the closed condition, to thereby give the adsorption state where the gas to be treated is sequentially supplied, and the treated gas is sequentially discharged.

On the other hand, the adsorption apparatus 1A sets the steam supply valve 12A to the open condition, and sets the gas to be treated supply valve 10A, the treated gas discharge valve 11A, the steam discharge valve 13A, and the cooling air supply valve 15A to the closed condition, to thereby give the compression state where only the steam is sequentially supplied. The operating conditions "e" through "h" are conditions with the adsorption apparatus 1A and the adsorption apparatus 1B switched with respect to the operating conditions "a" through "d". Therefore, description of thereafter is omitted.

As can be easily understood by observing FIG. 5, the adsorption apparatus 1A and the adsorption apparatus 1B alternately switch between the adsorption of the volatile organic compound from the gas to be treated, to the desorption of the volatile organic compound from the adsorbent. Furthermore, the adsorption of the volatile organic compound from the gas to be treated, that is, the removal treatment for the volatile organic compound of the gas to be treated is continuously performed by changing the adsorption apparatus 1A and the adsorption apparatus 1B so as to give the operating conditions "a" through "h".

The number of adsorption apparatuses is not limited to two (the adsorption apparatus 1A and the adsorption apparatus 1B). By operating an even larger number of adsorption apparatuses in parallel, the gas to be treated may be continuously treated.

Third Embodiment

Figure 6:
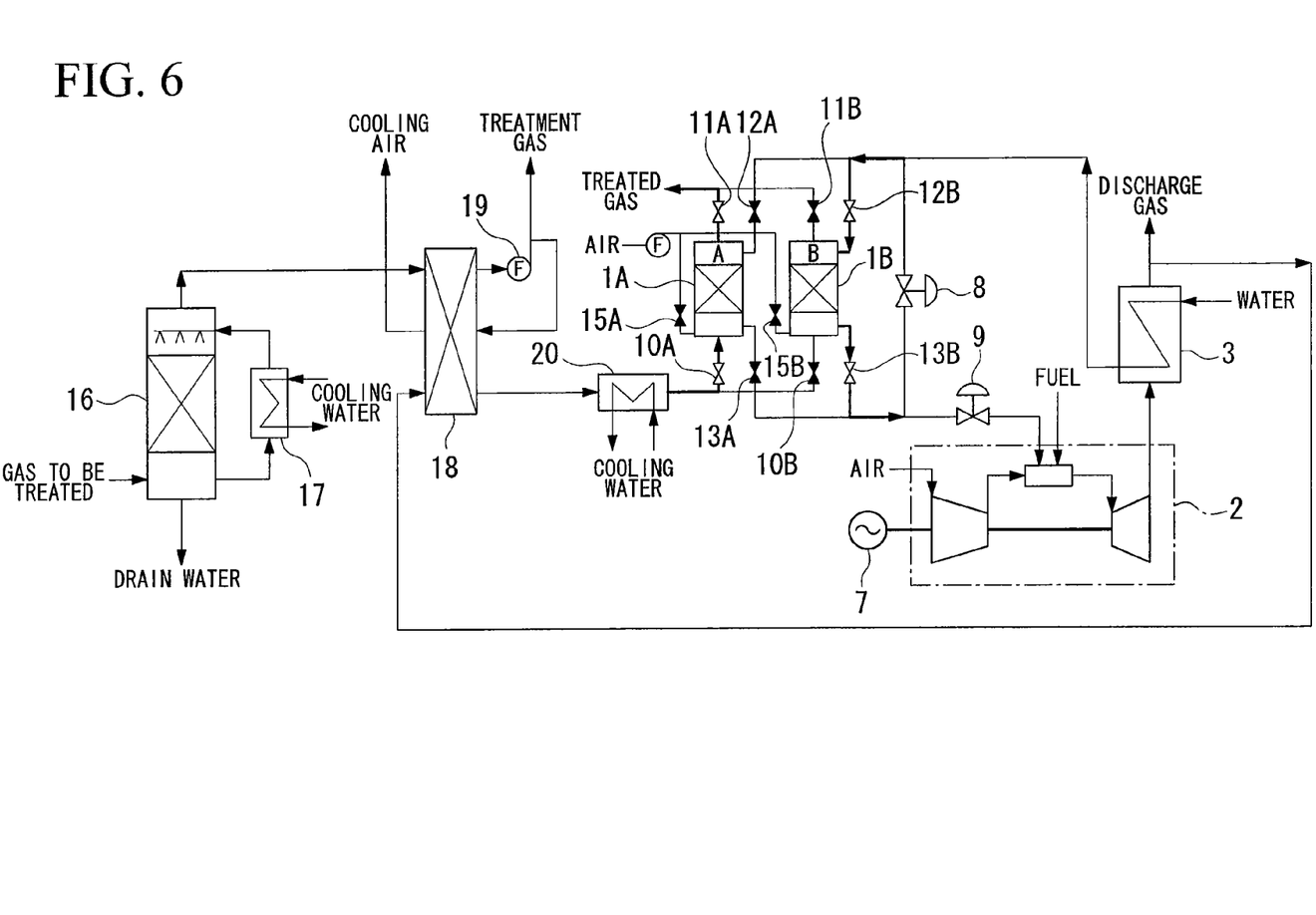
FIG. 6 is a system block diagram showing a characteristic configuration of a volatile organic compound treatment system according to a third embodiment of the present invention.

Next is a description of a third embodiment of the present invention, with reference to FIG. 6.

The third embodiment is one which applies pretreatment to the gas to be treated in order to improve the treatment efficiency. FIG. 6 is a system block diagram of a volatile organic compound treatment system according to the third embodiment. Components the same as for the volatile organic compound treatment system according to the first and second embodiments, are denoted by the same reference symbols.

In FIG. 6, reference symbol 16 denotes a dehumidifying tower, 17 and 20 denote chillers, 18 denotes a concentrator, and 19 denotes a fan. The dehumidifying tower 16 is a tower which dehumidifies the gas to be treated by gas/liquid contact with cold water. That is to say, the dehumidifying tower 16 is constructed so that gas to be treated is supplied from below, and the gas to be treated is discharged from above, while cold water is watered from above to below. Consequently, the gas to be treated is cooled by gas-liquid contact with the cold water so that the steam contained in the gas to be treated is condensed, separated, and entered into the cold water, and as a result the gas to be treated is dehumidified.

The chiller 17 cools the water discharged from the bottom of such a dehumidifying tower 16 and supplies this as the aforementioned cold water to the dehumidifying tower 16. The dehumidifying tower 16 and the chiller 17 constitute the dehumidifier.

The concentrator 18 concentrates the volatile organic compound contained in the gas to be treated (the dehumidified gas) discharged from the dehumidifying tower 16 and discharges this to the chiller 20. That is, in the concentrator 18, the gas to be treated is passed through activated carbon in powder form, to desorb and remove the volatile organic compound, and is discharged as treated gas. Together with this, the volatile organic compound which has been adsorbed in the activated carbon is desorbed from the activated carbon by means of discharge gas. As a result, discharge gas containing concentrated volatile organic compound is discharged as new gas to be treated. The discharge gas discharged from the steam generator 3 is high temperature gas of approximately 100° C., and by means of this high temperature discharge gas, the volatile organic compound is desorbed from the activated carbon.

The fan 19 is provided for forcefully discharging the treated gas from the concentrator 18. The chiller 20 cools the new gas to be treated and supplies this to the gas to be treated supply valves 10A and 10B. The new gas to be treated is gas which contains the volatile organic compound concentrated in the discharge gas discharged from the steam generator 3 as described above. Consequently, this is high temperature gas close to 100° C. The chiller 20 is provided for cooling this high temperature gas to be treated, to a temperature suitable for treatment in the adsorption apparatus 1A and the adsorption apparatus 1B.

In the present volatile organic compound treatment system, the gas to be treated is pretreated by the dehumidifier having the dehumidifying tower 16 and the chiller 17, and the concentrator 18. That is, after being subjected to dehumidifying treatment and concentration treatment, it is subjected to the main treatment (the treatment for removing the volatile organic compound) by the adsorption apparatus 1A and the adsorption apparatus 1B. Consequently, in the adsorption apparatuses 1A and 1B, new gas to be treated containing the volatile organic compound where the concentration is higher than for the aforementioned first and second embodiments is treated, and hence the treatment efficiency can be improved.

For example in the aforementioned FIG. 5, the situation where the adsorption apparatus 1A performs adsorption treatment from operating conditions "a" through "d", while the adsorption apparatus 1B performs adsorption treatment from the operating conditions "e" through "h" is shown. However, by performing pretreatment in the present embodiment, the time for the adsorption treatment can be shortened, and the treatment efficiency for the gas to be treated can be improved.

For the pretreatment, either one of dehumidifying treatment or concentration treatment is suitable. By means of the dehumidifying treatment, the steam in the gas to be treated is removed. Therefore, by this amount, the concentration of volatile organic compound in the gas to be treated is significantly increased. Consequently, even if pretreatment is performed by only the dehumidifying treatment, it is possible to improve the treatment efficiency of the gas to be treated. On the other hand, by means of only the concentration treatment also, the concentration of the volatile organic compound is significantly improved. Therefore, it is possible to improve the treatment efficiency of the gas to be treated.

Fourth Embodiment

Figure 7:
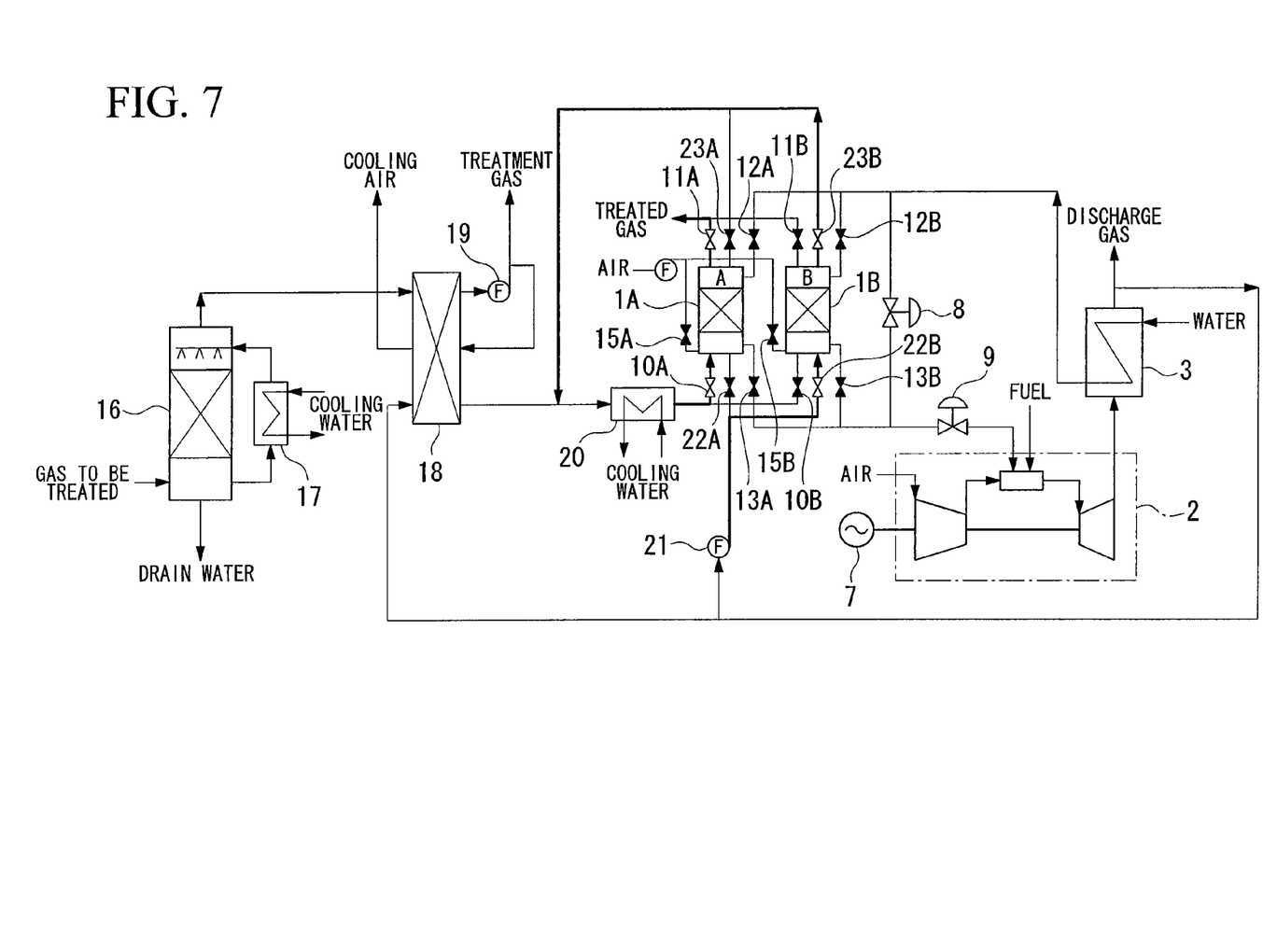
FIG. 7 is a system block diagram showing a characteristic configuration of a volatile organic compound treatment system according to a fourth embodiment of the present invention.

Next is a description of a fourth embodiment of the present invention, with reference to FIG. 7.

This volatile organic compound treatment system has a configuration where, as shown in FIG. 7, a fan 21, hot gas supply valves 22A and 22B, and hot gas discharge valves 23A and 23B are added to the volatile organic compound treatment system according to the third embodiment.

The fan 21 supplies discharge gas (hot gas) from the steam generator 3 to the hot gas supply valves 22A and 22B. The hot gas supply valve 22A is provided between this fan 21 and the discharge gas supply port of the adsorption apparatus 1A, and supplies/cuts off the discharge gas to the adsorption apparatus 1A. On the other hand, the hot gas supply valve 22B is provided between this fan 21 and the discharge gas supply port of the adsorption apparatus 1B, and supplies/cuts off the discharge gas to the adsorption apparatus 1B.

The hot gas discharge valve 23A is provided between the discharge gas discharge port of the adsorption apparatus 1A and the gas to be treated supply port of the chiller 20, and supplies/cuts off the discharge gas discharged from the adsorption apparatus 1A to the gas to be treated supply port of the chiller 20. The hot gas discharge valve 23B is provided between the discharge gas discharge port of the adsorption apparatus 1A and the gas to be treated supply port of the chiller 20, and supplies/cuts off the discharge gas discharged from the adsorption apparatus 1A to the gas to be treated supply port of the chiller 20.

The adsorption apparatuses 1A and B are those shown in FIG. 3 through FIG. 5 as described for the second embodiment. However due to supplying pressurizing steam to the adsorption apparatuses 1A and 1B under normal temperature conditions in the pressurizing treatment, a part of the steam is condensed and becomes drain water. Moreover, a very small amount of volatile organic compound adhered to the adsorbent due to the adsorption treatment, infiltrates into this drain water.

This volatile organic compound treatment system is for solving such a problem, and between the adsorption treatment and the heating treatment shown in FIG. 3 through FIG. 5, performs heat treatment using; the abovementioned fan 21, the hot gas supply valves 22A and 22B, the hot gas discharge valves 23A and 23B, and the discharge gas discharged from the steam generator 3.

Since either one of the adsorption apparatuses 1A and 1B performs the same heat treatment, then taking the adsorption apparatus 1B as representative, when the adsorption treatment is completed by supplying the gas to be treated to the adsorption apparatus 1B and discharging the treated gas, the hot gas supply valve 22B and the hot gas discharge valve 23B only are opened. As a result, discharge gas discharged from the fan 21 is supplied to the adsorption apparatus 1B to thereby heat the adsorption apparatus 1B interior. Since this discharge gas has a temperature of approximately 100° C. as described above, the interior of the adsorption apparatus 1B can be heated to a sufficient level so that condensation of steam does not occur.

As a result, the situation where the steam condenses due to the next step, that is, the pressurizing treatment using steam, can be prevented, and the aforementioned problem of the drain water of the adsorption apparatuses 1A and 1B can be solved. Consequently, according to this volatile organic compound treatment system, the volatile organic compound contained in the drain water of the adsorption apparatuses 1A and 1B can be effectively used as an energy source, and also by burning the volatile organic compound as a part of the fuel of the gas turbine 2, even better energy conservation can be realized.

In the case where it is not necessary to treat the volatile organic compound contained in the drain water of the adsorption apparatuses 1A and 1B, this drain water may be supplied to the discharge gas discharge port of the steam generator 3, and evaporated and discharged into the atmosphere. Since the water quantity of the drain water is not very large, this can be sufficiently evaporated by supplying to the discharge gas discharge port of the steam generator 3.

Fifth Embodiment

Figure 8:
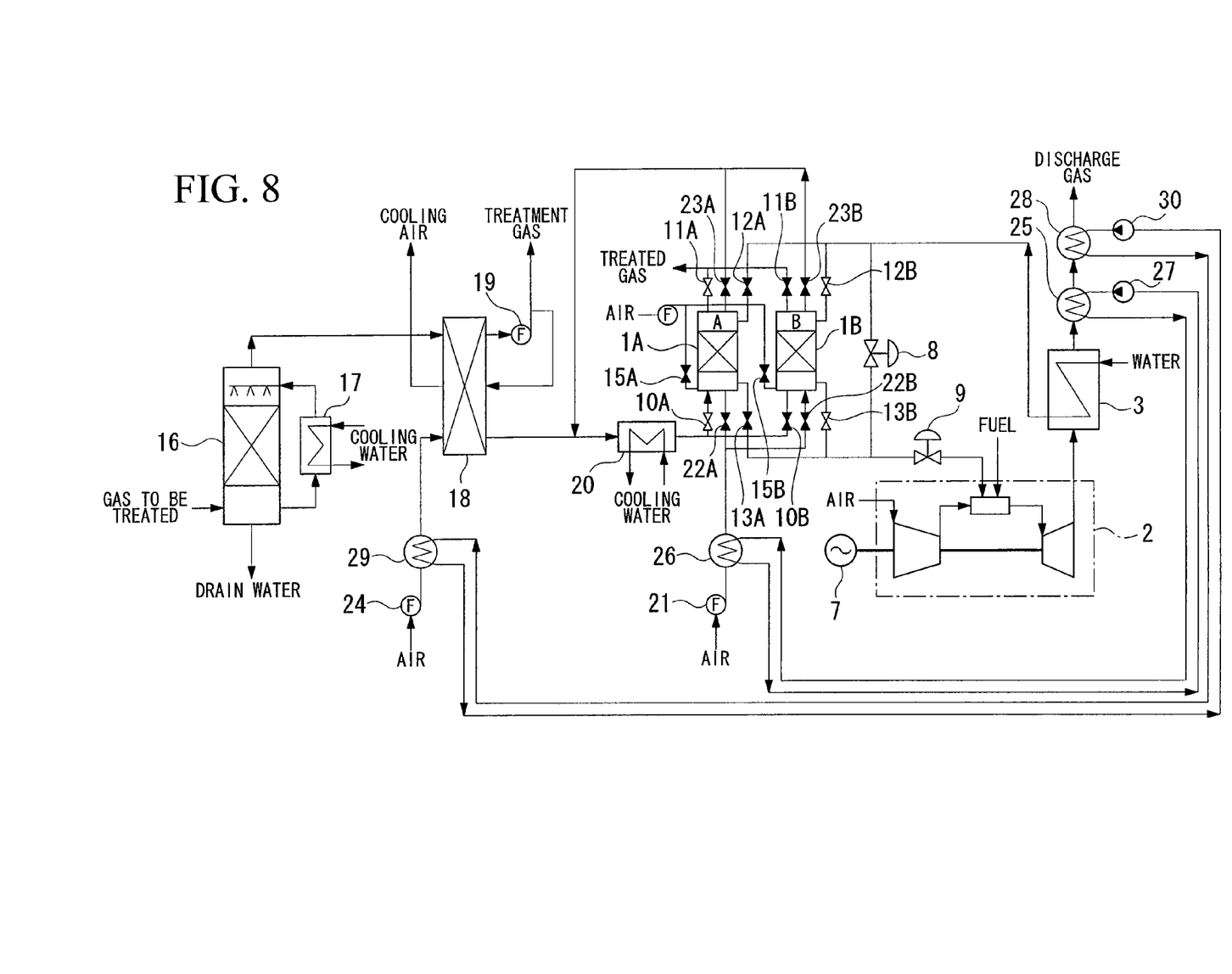
FIG. 8 is a system block diagram showing a characteristic configuration of a volatile organic compound treatment system according to a fifth embodiment of the present invention.

Finally is a description of a fifth embodiment of the present invention with reference to FIG. 8.

This volatile organic compound treatment system corresponds to a case where the steam generator 3 is arranged separated from other equipment, and corresponds to a modified example of the aforementioned third and fourth embodiments.

In the volatile organic compound treatment system of the third embodiment, the discharge gas discharged from the steam generator 3 was used as a heat source for concentrating the gas to be treated in the concentrator 18. On the other hand, in the volatile organic compound treatment system of the fourth embodiment, the discharge gas discharged from the steam generator 3 was used as a heat source for suppressing generation of drain water of the adsorption apparatuses 1A and 1B.

However, in these volatile organic compound treatment systems, in the case where the steam generator 3 is arranged away from the concentrator 18 or the adsorption apparatuses 1A and 1B, it is necessary to install a comparatively large duct over a long distance for supplying the discharge gas to the concentrator 18 or the adsorption apparatuses 1A and 1B, and a comparatively large ventilation power is necessary. Therefore this invites an increase in equipment cost and an increase in running cost.

In this volatile organic compound treatment system, compared to the configuration of the aforementioned fourth embodiment, instead of discharge gas, air is supplied to the fan 21, and instead of discharge gas, air is supplied to the concentrator 18 from a fan 24. Furthermore, the discharge air from the fan 21 is heated by a first heating system having heat exchangers 25 and 26, and a pump 27, while on the other hand, discharge air from the fan 24 is heated by a second heating system having heat exchangers 28 and 29, and a pump 30.

The heat exchanger 25 is provided in the vicinity of the discharge gas discharge port of the steam generator 3, and performs heat exchange between the discharge gas and a predetermined heating medium. The heat exchanger 26 is provided in the vicinity of the air discharge port of the fan 21 and performs heat exchange between the air discharged from the fan 21 and the heating medium. The pump 27 is provided part way along a heating medium circulation duct provided between the heat exchanger 25 and the heat exchanger 26, and circulates the heating medium between the heat exchanger 25 and the heat exchanger 26.

The heat exchanger 28 is provided in the vicinity of the discharge gas discharge port of the steam generator 3, and performs heat exchange between the discharge gas and a predetermined heating medium. The heat exchanger 29 is provided in the vicinity of the air discharge port of the fan 24 and performs heat exchange between the air discharged from the fan 24 and the heating medium. The pump 30 is provided part way along a heating medium circulation duct provided between the heat exchanger 28 and the heat exchanger 29, and circulates the heating medium between the heat exchanger 28 and the heat exchanger 29.

In the present volatile organic compound treatment system constructed in this manner, the discharge gas discharged from the steam generator 3 is not supplied directly to the concentrator 18 and the adsorption apparatuses 1A and 1B, but the heat of the discharge gas is transferred to the air discharged from the fans 21 and 24 using the first and second heating systems to thereby heat the air to give heated air, and this heated air is supplied to the concentrator 18 and the adsorption apparatuses 1A and 1B as hot gas.

Here, by using a liquid heating medium with a large comparative heat capacity for the heating medium, gives an installation where the respective heating medium circulation ducts are significantly reduced compared to the ducts for supplying the discharge gas to the concentrator 18 and the adsorption apparatuses 1A and 1B. Furthermore in the case where the heat capacity of the heating medium is large, the circulation flow quantity of the heating medium can be kept comparatively small. Therefore the power for the fans 27 and 30 can be kept smaller than the air distribution power for supplying the discharge gas to the concentrator 18 and the adsorption apparatuses 1A and 1B.

Consequently, according to this volatile organic compound treatment system, it is possible to avoid an increase in equipment cost and an increase in running cost in the case where the steam generator 3 is provided away from the concentrator 18 or the adsorption apparatuses 1A and 1B.

The invention claimed is:

1. A system for treating a volatile organic compound, comprising:
    an adsorption apparatus including a housing, the adsorption apparatus configured and operable to adsorb a volatile organic compound contained in a gas to be treated in an adsorbent positioned in the housing, the adsorption device further configured and operable to desorb said volatile organic compound which is adsorbed in said adsorbent in the housing using steam under a pressurized environment, and to mix said volatile organic compound with said steam in said housing; and
    a gas turbine which burns said steam mixed with said volatile organic compound in a combustion chamber.

2. A system for treating a volatile organic compound according to claim 1, comprising a steam generation apparatus which generates steam using heat of combustion gas discharged from said gas turbine.

3. A system for treating a volatile organic compound according to claim 1, further comprising a plurality of adsorption apparatuses, and a switching apparatus which switches said plurality of adsorption apparatuses so that adsorption of the volatile organic compound in the adsorbent, and desorption of the volatile organic compound from the adsorbent are alternately performed in parallel.

4. A system for treating a volatile organic compound according to claim 2, further comprising a plurality of adsorption apparatuses, and a switching apparatus which switches said plurality of adsorption apparatuses so that adsorption of the volatile organic compound in the adsorbent, and desorption of the volatile organic compound from the adsorbent are alternately performed in parallel.

5. A system for treating a volatile organic compound according to claim 1, further comprising a steam bypass control valve which adjusts a flow of steam supplied directly to a combustion chamber without passing through the adsorption apparatus.

6. A system for treating a volatile organic compound according to claim 1, further comprising a pretreatment apparatus for concentrating a volatile organic compound contained in a gas to be treated, before adsorbing the volatile organic compound in the adsorbent.

7. A system for treating a volatile organic compound according to claim 6, wherein said pretreatment apparatus is either one or both of; a concentrator which concentrates the volatile organic compound by desorbing the volatile organic compound from the adsorbent using a hot gas, and a dehumidifier which removes the water content from the gas to be treated, after adsorbing the volatile organic compound being a treatment object, in a predetermined adsorbent.

8. A system for treating a volatile organic compound according to claim 2, wherein heating is performed using a hot gas, before desorbing the volatile organic compound in the adsorbent with steam, in the adsorption apparatus.

9. A system for treating a volatile organic compound according to claim 7, wherein the hot gas is discharge gas of combustion gas which has been supplied for generating steam in the steam generator.

10. A system for treating a volatile organic compound according to claim 7, wherein there is further provided a heating apparatus which heats air by heat exchange with discharge gas of combustion gas which has been supplied for generating steam, and the hot gas is hot air discharged from the heating apparatus.

* * * * *